(12) United States Patent
de Lorenzo

(10) Patent No.: US 7,967,233 B2
(45) Date of Patent: Jun. 28, 2011

(54) BRAKE DEVICE OF WEBBING OR BELT CARTRIDGES OF LINE ORGANIZATION POLES

(76) Inventor: Ricardo Augusto de Lorenzo, Sao Paulo (BR)

( * ) Notice: Subject to any disclaimer, the term of this patent is extended or adjusted under 35 U.S.C. 154(b) by 911 days.

(21) Appl. No.: 11/587,120

(22) PCT Filed: Feb. 22, 2005

(86) PCT No.: PCT/BR2005/000023
§ 371 (c)(1), (2), (4) Date: Oct. 20, 2006

(87) PCT Pub. No.: WO2005/105640
PCT Pub. Date: Nov. 10, 2005

(65) Prior Publication Data
US 2007/0164144 A1 Jul. 19, 2007

(30) Foreign Application Priority Data
Apr. 30, 2004 (BR) .................................. 8400821 U

(51) Int. Cl.
*B65H 75/30* (2006.01)
(52) U.S. Cl. ........................................ 242/381.5; 256/1
(58) Field of Classification Search .................. 242/289, 242/381.5; 256/1, 24, 32, 45, 59, 65.11
See application file for complete search history.

(56) References Cited

U.S. PATENT DOCUMENTS

| | | | | |
|---|---|---|---|---|
| 4,907,756 A | * | 3/1990 | Bourrat | 242/381.5 |
| 5,722,612 A | * | 3/1998 | Feathers | 242/381.5 |
| 5,967,443 A | * | 10/1999 | Green | 242/381.5 |
| D492,422 S | | 6/2004 | de Lorenzo | |
| 6,830,236 B2 | | 12/2004 | Augusto de Lorenzo | 256/1 |
| 7,178,790 B2 | * | 2/2007 | de Lorenzo | 256/59 |
| 2005/0017115 A1 | | 1/2005 | de Lorenzo | 242/378.4 |
| 2005/0023403 A1 | * | 2/2005 | Lu | 242/381.5 |

FOREIGN PATENT DOCUMENTS

| | | |
|---|---|---|
| CH | 78 314 A | 11/1918 |
| GB | 2 360 995 A | 10/2001 |
| GB | 2 376 051 A | 12/2002 |

OTHER PUBLICATIONS

International Search Report of PCT/BR2005/000023.

* cited by examiner

*Primary Examiner* — William A Rivera
(74) *Attorney, Agent, or Firm* — McCormick, Paulding & Huber LLP

(57) ABSTRACT

The present invention relates to a brake device for webbing or belt cartridges built as a flexible one piece body (1), preferably made of a material like rubber, doted with a characteristic design. Said single flexible body comprises an ellipsoidal central portion (2), having in its center two symmetrical openings (3) for coupling to a reel, and two radially spaced rods (4), said rods having a rounded shape finishing, conforming two brackets (5) in circumference arcs.

3 Claims, 3 Drawing Sheets

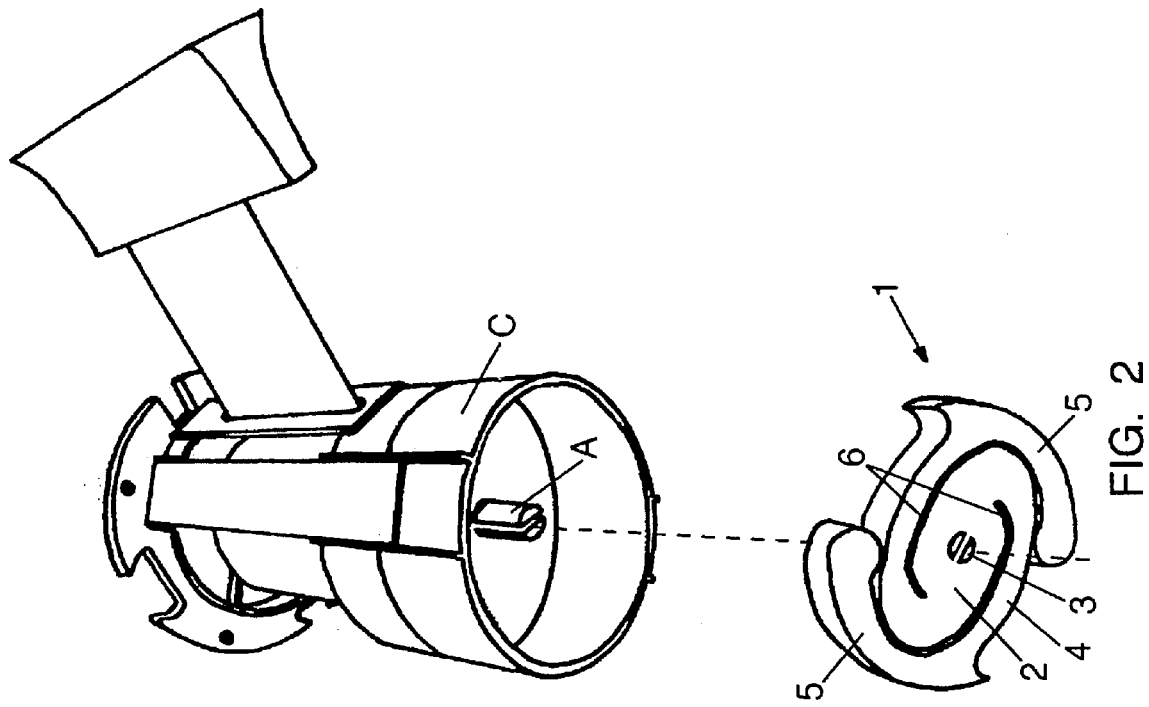
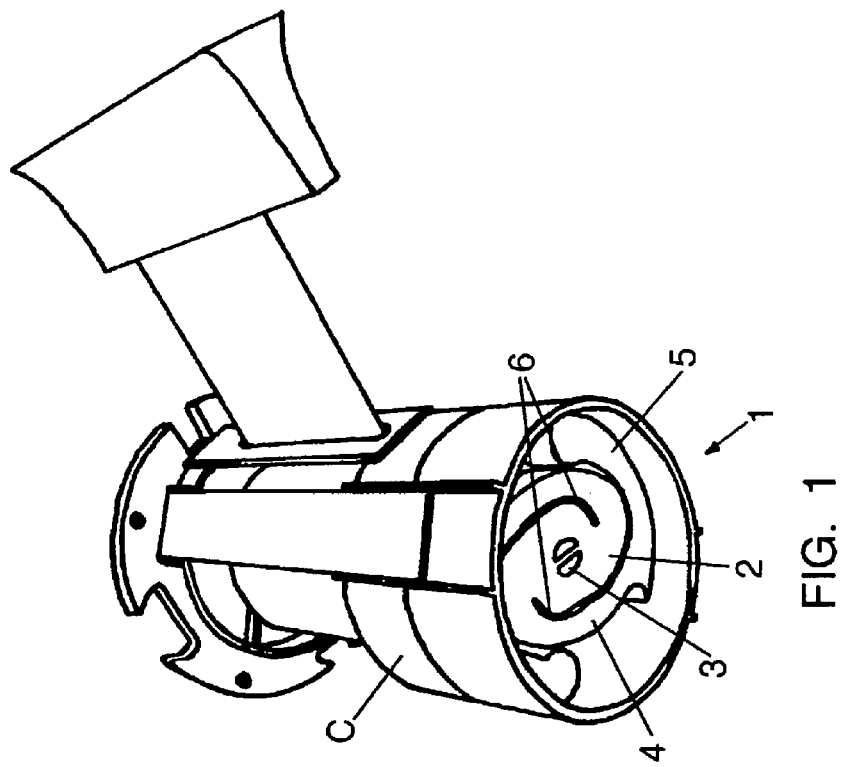

BRAKE DEVICE OF WEBBING OR BELT CARTRIDGES OF LINE ORGANIZATION POLES

CROSS REFERENCE TO RELATED APPLICATIONS

This application is entitled to the benefit of and incorporates by reference essential subject matter disclosed in International Patent Application No. PCT/BR2005/000023 filed on Feb. 22, 2005 and Brazil Patent Application No. MU8400821-0 filed Apr. 30, 2004. Also incorporated by reference are; U.S. Design Pat. No. D492,422 S; published Patent Application No.: U.S. 2005/0017115 A1 (Ser. No. 10/886,977, filed Jul. 8, 2004); and U.S. Pat. No. 6,830,236 B2 issued Dec. 14, 2004.

FIELD OF THE INVENTION

The present constructive disposition is applied in the brake device of webbing or belt cartridges of line organization poles.

More particularly, the present patent introduces an inventive disposition, with new characteristics that provide a far more efficient construction for a brake system applied to a retractable webbing or belt cartridge used in line organization poles.

The invention presented herein discloses a new brake system applied to a retractable webbing or belt cartridge, particularly for the use in line organization poles, fields marking poles, passage orientation poles and the like.

Basically, such poles with webbings or belts consist in the best tool to be employed in any kind of space or field where organization shall be pre-established.

Said poles with webbings or belts, for quite some time, have been successfully applicable to orientating people's passage and/or defining sites for pieces/art works display, for example, in events, trade fairs, exhibitions, museums, hotels, banks, airports check-ins and other airport facilities, public services bureaus and etc.

BACKGROUND OF THE INVENTION

As of general, ordinary and common knowledge, poles with webbings or belts an are vastly used for defining sites for pieces/art works display and/or people line organization in many places like sales counters, information counters, payment counters, check-in and check-out counters, reception counters and the like in various facilities as events halls, trade fairs, parks, exhibitions, museums, hotels, banks, airports, public services bureaus and etc.

Such poles are in general manufactured in folded, stamped or more preferably in extruded profiles of metal, even more preferably a metal like aluminum.

Said extruded aluminum profiles are produced with a characteristic design, which allows the assembling of an internal mechanism that may bear the webbing or belt cartridge apparatus.

The webbing or belt cartridge apparatus consists in a casing containing a webbing or belt reel device.

Said webbing or belt reel device is ordinarily retractable, it means that it is doted with a return system for collecting the webbing or belt after being pulled out of the cartridge.

Such webbing or belt allowing to be drawn out of the cartridge to a pre-determined distance, which is given by the length of the webbing or belt wound into said reel.

Said webbing or belt wound into the reel has one of its ends fixed to the reel frame and at the opposite end, it is provided with a coupling element.

Said coupling element consists in the fixture that allows such webbing or belt to be attached to other adjacent similar poles profiles.

Once the webbings or belts must be tightly held between the poles, they imply in a tensioned coupling.

Said tensioned coupling are achieved due to the retractable property provided to the reels, said property granted by the above mentioned return system for collecting the webbing or belt after it is pulled out of the cartridge.

This retractable property, besides functioning as the webbing or belt collecting element, it provides that the array—pole/webbing/pole—always remains tightly displayed.

On the other hand, aiming to avoid any undesired situation, said reels with the retractable property are, most of the times, provided with a back-up system, which consists mainly in a specific assembling of a brake element.

Said brake element works as a safety device that prevents the webbing or belt sudden and abrupt return back into the cartridge, in the event of an undesired uncoupling of the webbing or belt out of the next adjacent pole.

Such safety brake device interrupts the return or retraction function of the webbings or belts back into the cartridge.

The interruption or brake main objective is to avoid that people working in the lines organization assembly or even people in the surroundings get hurt with the webbing or belt abrupt displacement due to an undesired or mistaken uncoupling.

Therefore, the reels known in the art already bear a safety device, which is constituted by a movement interruption function given by brake system.

However, the brake systems of the known art are designed and built, assembling together several small parts, which constitutes the bottleneck of the production line.

The brake systems of the known art, because of the way they are designed must be assembled in a separate cell/process, inside the cartridge assembling line, or outsourced.

This separate unit/cell in the assembling brake system process or even the outsourcing option, slows down the whole manufacturing process, making the final product more expensive and more susceptible to defects, repairs and replacement.

In both alternatives the brake systems of the known art generates extra costs with personnel, either in production or in process/quality control.

But the drawback of the brake system already known in the art isn't only concerned to the manufacturing process.

Due to it's several pieces assembled together, the consumers or the product's final clients must keep spare parts for the maintenance of the brake systems of the art, along with specialized personnel to perform it.

And worse, final clients must also keep extra cartridges, or ultimately, extra entire poles, to replace those, which are taken out of work for maintenance.

The features presented above indicate that the webbing or belt reels' brake system known in the art, besides raising the product's sales price, make the poles utilization by the final users very expensive and unpractical because of maintenance issues.

Said unavoidable costs along with all the inconveniences that the maintenance matters bring along, eventually reduce dramatically the benefits granted by this product added value, such as it's use as advertising media, as a mere example.

SUMMARY OF THE INVENTION

In consideration to the circumstances above and aiming to overcome the presented drawbacks, a new constructive disposition was developed and is disclosed in the present invention.

In general, the constructive disposition of the present invention herein disclosed, presents a new and inventive brake system for the webbing or belt reels.

The main object of the constructive disposition of the present invention is achieved by the fact that the brake system device is constituted of one single piece.

Another objective of the constructive disposition of the present invention is the easy way that the device can be assembled.

Yet another objective of the constructive disposition of the present invention is the advantage obtained by its reduced production time and simplified assembling, which can be achieved by one single coupling system through one single operation.

Therefore, the pole bearing the constructive disposition of the present invention presents a brake device for a belt or webbing reel, preferably produced in a flexible material like plastic or rubber.

This flexible material piece is conformed into one single piece, doted with a characteristic design and features, which allows a simpler assembling, reducing this way the periodicity of the maintenance work as well as the quantity of extra parts and whole poles that should have been kept in inventory to replace those poles out of work due to preventive or reparative maintenance.

BRIEF DESCRIPTION OF THE DRAWINGS

For a better understanding of the objectives of the constructive disposition of the present invention, a prior art post and web cartridge are shown in FIG. 5 labeled "prior art."

FIG. 1—Represents a perspective view of a webbing or belt reel assembled along with the brake device of the present invention;

FIG. 2—Represents another perspective view, although, this time exploded, depicting the webbing or belt reel assembled along with the brake device of the present invention;

DETAILED DESCRIPTION OF THE INVENTION

Figure 5:
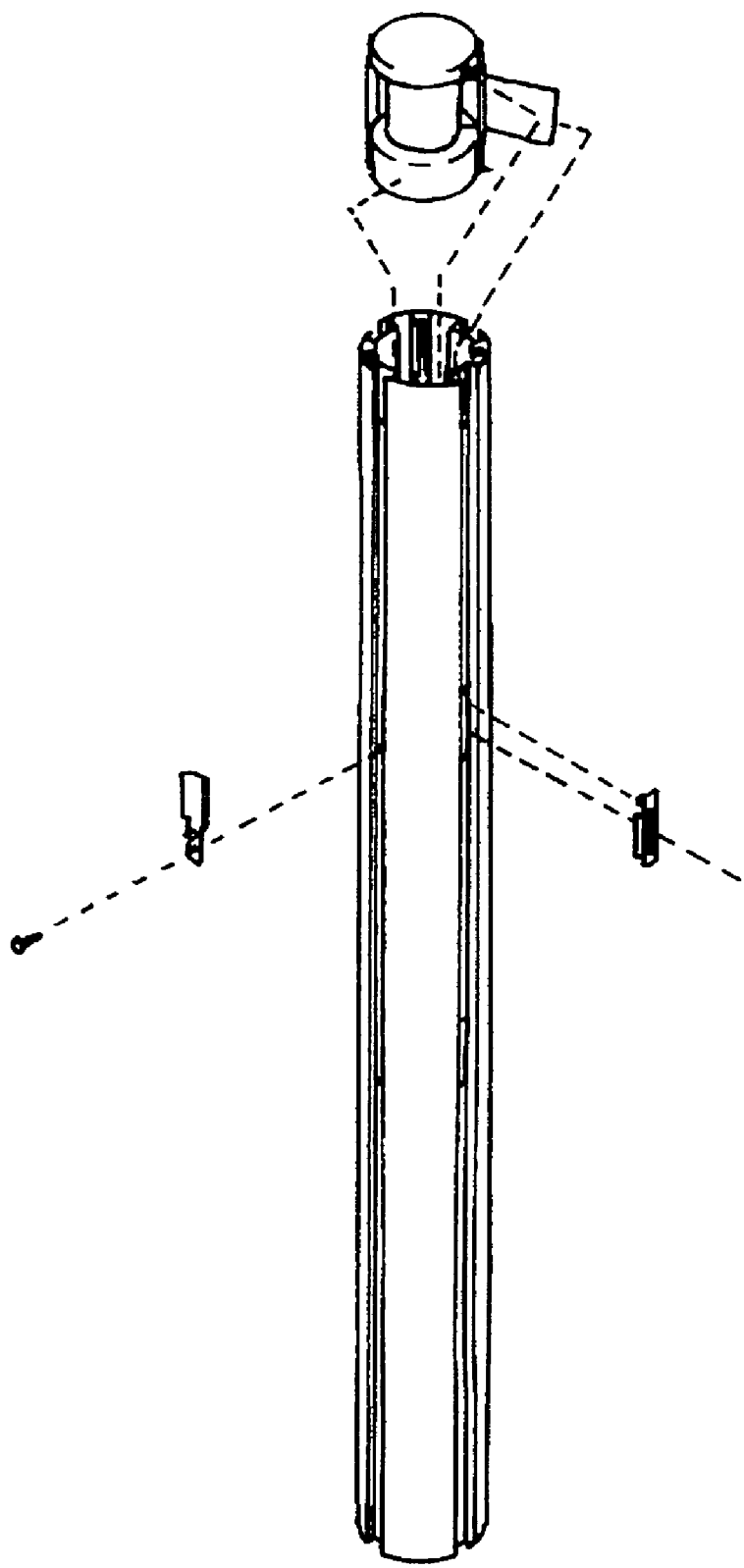
FIG. 5—Represents a view taken from Ser. No. 10/886,977 and shows a prior art reel cartridge and post.

According to the figures described above and their details, the constructive disposition of the present invention is in a web brake associated with a retractable web of the type provided in a cartridge for placement in a pole as shown in the view labeled "Prior Art" (FIG. 5). The improvement lies in the elastomeric one piece coupling element (1), built in a single body, preferably made of a material slightly flexible like rubber, with a characteristic design to be described.

Said one piece is made of flexible material and has an ellipsoidal central portion (2), in which center it is provided with two symmetrical openings (3) for coupling and having two rods (4), said rods having a rounded shape finishing, conforming two brackets (5) into circumference arcs.

Between the referred two rods (4) and the central portion (2) are configured two openings (6), which determine a displacement area of said rods (4), being vital for the perfect functioning of the reel brake (C), since said space is necessary for the elastic deformation of the device, and is what enables its functioning.

According to such constructive features, said single body piece (1), preferably made of a slightly flexible material like rubber, featured in a characteristic design, is coupled along with a headstock (A), provided at the bottom portion of the webbing reel (C) at the referred openings (3), being that the two brackets (5) are positioned adjacent to the internal wall of the reel (C) base.

This way, when the webbing or belt is unwound, there is no incidence of work of the brake, since the single body piece (1) does not create a large contact area, reducing the attrition force between the single body piece (1) and the internal wall of the reel (C) base, since the elastic deformation of the single body piece (1) contracts the rods (4) and consequently the brackets (5), minimizing the contact area (T) between the parties.

When the webbing or belt is withdrawn, the reel (C) presents the reverse movement, spinning the headstock (A) and the brake device, and according to the characteristic single body piece (1) design, the same gets deformed, displacing the rods (4) and consequently the brackets (5), making said rods (4) and brackets (5) go under a great attrition force against the internal wall of the reel (C) base, dramatically increasing the contact area (T) between the parties and occasioning a significant speed drop in the webbing or belt displacement.

Figure 3:
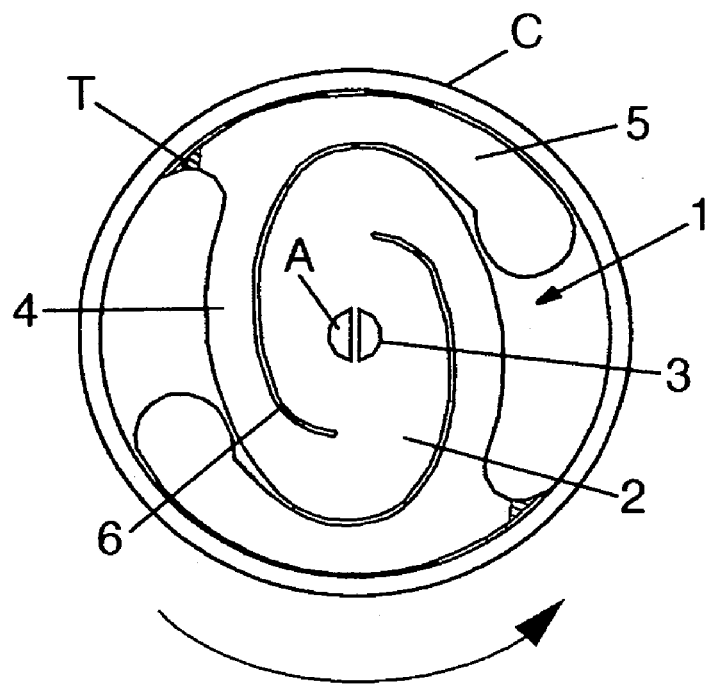
FIG. 3—Represents a plan view illustrating the referred brake device of the present invention assembled at the bottom portion of the said webbing or belt reel and showing the area of attrition during the movement of unwinding the webbing or belt from it's reel.
Figure 4:
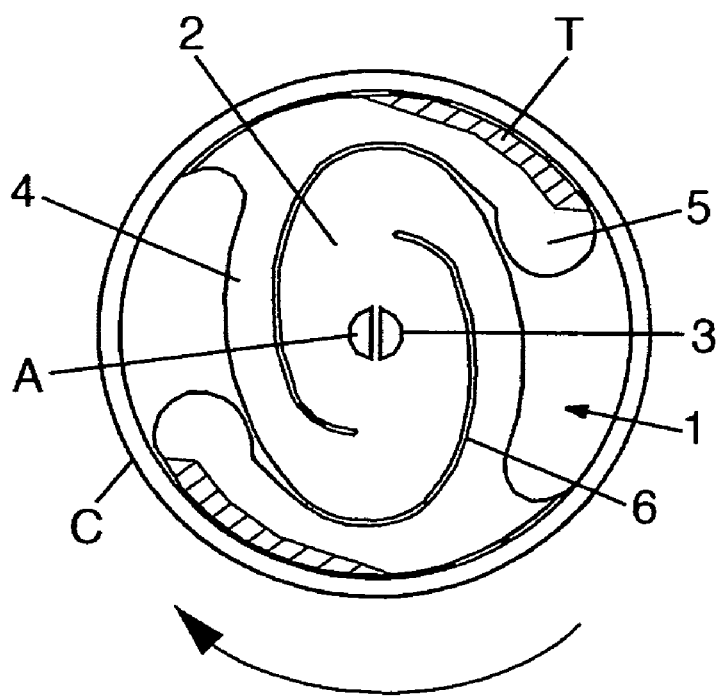
FIG. 4—Represents a plan view, like in FIG. 3, although showing the area of attrition during the movement of winding the webbing or belt onto the reel during retraction. Note that the arrows in FIGS. 3 and 4 are associated with rotation of the coupling element inside the cartridge shell.

The one piece elastomeric coupling 1 has an elliptical center portion 2 which is connected to and rotates with the reel or spool inside the cartridge C, as suggested by the broken line in FIG. 02. The bifurcated end of headstock A fits into openings 3,3 in the coupling as shown in FIGS. 01 and 02. The coupling 1 defines outer portions, called "brackets" 5,5 with frictional contact areas (T,T in FIG. 04) for frictionally contacting the inner surface of the fixed shell, at least during rotation of the coupling in the direction indicated in FIG. 04. The rotational direction indicated in FIG. 04 corresponds to winding of the web on the spool or reel inside the cartridge C. The cartridge is fixed and includes a downwardly open shell C for receiving the coupling shown in FIG. 01. Two such outer portions 5,5 are shown, each being integrally connected to the center portion 2 of the one piece coupling 1 by a resiliently deformable connective "rod" portion 4,4. These integrally formed connective portions 4,4 spiral outwardly alongside the elliptical center portion such that junctures between them and the outer "bracket" portions 5,5 define alternative contact areas (T,T in FIG. 03) that offer only limited resistance to rotation of the coupling in the opposite, or unwind direction. However, rotation of the coupling in the web winding direction results in increased resistance due to greater friction created at the contact areas T,T in FIG. 04.

As can be appreciated from what has been disclosed and illustrated herein, the object in question of the present application, fits perfectly in the criteria of novelty and inventive step pursuing patent protection.

The constructive disposition of the present invention clearly shows the features of novelty, inventive act and industrial applicability.

The inventor, regarding the present constructive disposition, has arranged and modified known elements, granting to such components a new form as well as a different disposition, resulting in a product with enhanced efficiency, either in its manufacturing process, cost, or benefits to the final user (products consumer).

The inventor improved the object of the present invention regarding its performance as a whole, making its application more efficient, which generated as consequence a market breakthrough in terms of offering a greater value added product.

It must be noted that all features depicted hereinabove shall be considered more as an example of the preferred embodiment than a limitation factor that concludes the disposition herein presented in itself.

Other embodiments and/or applications can be effected without departing from the objective and the scope of the present inventive constructive disposition.

While the present inventive constructive disposition has been described with reference to a certain specific application, it is certain to be recognized by those skilled in the specific art, that multiple variations regarding the application of the present inventive constructive disposition are possible, and therefore, shall be admitted.

Many variations regarding the application of the present inventive constructive disposition are possible within the scope of what is claimed ahead.

What is claimed is:

1. In a system of poles and webs provided on spools in cartridges mounted in the poles, the webs being biased toward wound positions on the spools, and each cartridge rotatably supporting a spool so that a web can be unwound from the spool through a slot in the pole, the improvement to the cartridge comprising;

an annular shell (C) defining an internal cylindrical wall, a head shaft centered in said shell, and a one piece elastomeric coupling (1) provided inside said fixed shell, and having an elliptically shaped center portion (2) connected to said head shaft for rotation therewith, said coupling defining at least two outer portions (5,5), each with a frictional contact area (T,T FIG. 05) in circumferential contact with said internal shell wall, said coupling having at least two resiliently deformable connective portions (4,4) integrally connecting said central portion (2) to each of said outer portions (5,5) respectively, said resiliently deformable connective portions being spaced closely to the elliptically curved central portion of said one piece coupling, each of said at least two outer portions and each of said at least two connective portions spiralling outwardly around said elliptical center portion in the direction of rotation of said spool during biased web winding rotation of the spool.

2. The combination according to claim 1 further including alternative contact areas (T,T, FIG. 04) located adjacent to the connected end portions of each of said at least two outer portions and each of said flexibly resilient connective portions respectively, said alternate contact areas (T,T FIG. 4) projecting oppositely to said direction of rotation of said spool during winding rotation thereof.

3. The combination according to claim 2 wherein said head-shaft has a bifurcated end portion, said coupling center portion having two openings for receiving said bifurcated end portion of said spool head-shaft (A).

* * * * *